(12) United States Patent
Cheng et al.

(10) Patent No.: US 10,782,536 B2
(45) Date of Patent: Sep. 22, 2020

(54) LASER DEVICE FOR ADDITIVE MANUFACTURING AND OPERATION METHOD THEREOF

(71) Applicant: TONGTAI MACHINE & TOOL CO., LTD., Kaohsiung (TW)

(72) Inventors: Chung-wei Cheng, Kaohsiung (TW); Chun-yu Tsai, Kaohsiung (TW); Chih-hsiang Yang, Kaohsiung (TW); Hsin-pao Chen, Kaohsiung (TW); Jui-hsiung Yen, Kaohsiung (TW)

(73) Assignee: TONGTAI MACHINE & TOOL CO., LTD, Kaohsiung (TW)

( * ) Notice: Subject to any disclaimer, the term of this patent is extended or adjusted under 35 U.S.C. 154(b) by 169 days.

(21) Appl. No.: 15/988,559

(22) Filed: May 24, 2018

(65) Prior Publication Data

US 2019/0310483 A1 Oct. 10, 2019

(30) Foreign Application Priority Data

Apr. 10, 2018 (CN) .......................... 2018 1 0314505

(51) Int. Cl.
| | |
|---|---|
| *B23K 26/082* | (2014.01) |
| *B23K 26/064* | (2014.01) |
| *B29C 64/20* | (2017.01) |
| *B33Y 30/00* | (2015.01) |
| *G02B 27/10* | (2006.01) |
| *G02B 27/09* | (2006.01) |
| *G02B 26/10* | (2006.01) |
| *B33Y 10/00* | (2015.01) |
| *B29C 64/393* | (2017.01) |
| *B33Y 50/02* | (2015.01) |

(Continued)

(52) U.S. Cl.
CPC ........ *G02B 27/1093* (2013.01); *B29C 64/153* (2017.08); *B29C 64/268* (2017.08); *B29C 64/393* (2017.08); *B33Y 10/00* (2014.12); *B33Y 30/00* (2014.12); *B33Y 50/02* (2014.12); *G02B 26/105* (2013.01); *G02B 27/0955* (2013.01)

(58) Field of Classification Search
None
See application file for complete search history.

(56) References Cited

U.S. PATENT DOCUMENTS

| | | | |
|---|---|---|---|
| 2009/0207407 A1* | 8/2009 | Vance | ................... G02F 1/0126 356/327 |
| 2012/0228802 A1 | 9/2012 | Kan et al. | |

(Continued)

FOREIGN PATENT DOCUMENTS

| | | |
|---|---|---|
| CN | 105188994 A | 12/2015 |
| CN | 106475685 A | 3/2017 |

OTHER PUBLICATIONS

English translation (annotated with paragraph numbers) of CN106475685 (Year: 2017).*

*Primary Examiner* — Jacob T Minskey
*Assistant Examiner* — Baileigh Kate Darnell

(57) ABSTRACT

A laser device for additive manufacturing and an operation method thereof are provided. The laser device has a laser generation unit, a spectroscopic unit, a control unit, and a lens assembly unit. A laser beam is split into two or more beams by disposing the spectroscopic unit and the lens assembly unit. Thus, a roughness of a process surface and a process time can be reduced.

7 Claims, 7 Drawing Sheets

(51) Int. Cl.
*B29C 64/153* (2017.01)
*B29C 64/268* (2017.01)

(56) References Cited

U.S. PATENT DOCUMENTS

| | | | |
|---|---|---|---|
| 2013/0050697 A1* | 2/2013 | Colbourne | G02B 27/4244 356/328 |
| 2013/0064706 A1* | 3/2013 | Schwarze | B22F 3/1055 419/1 |
| 2016/0101492 A1* | 4/2016 | Chuang | B23K 26/0093 409/136 |
| 2016/0144571 A1 | 5/2016 | Philippi | |
| 2016/0250717 A1 | 9/2016 | Kruger et al. | |
| 2017/0120337 A1* | 5/2017 | Kanko | B22F 3/1055 |
| 2019/0047083 A1* | 2/2019 | Fujita | B23K 26/382 |

* cited by examiner

LASER DEVICE FOR ADDITIVE MANUFACTURING AND OPERATION METHOD THEREOF

FIELD OF INVENTION

The present disclosure relates to a laser device and an operation method thereof, and in particular to a laser device for additive manufacturing and an operation method thereof.

BACKGROUND OF INVENTION

Additive manufacturing technology is also known as three-dimensional (3D) printing or rapid prototyping technology. It is technology that uses an adhesive material (such as powdered metal or plastic) or a fuse to construct an object by stacking up a layer and a layer based on digital module data. Current commonly-used methods of additive manufacturing include laser powder melting, electron beam powder melting, laser coaxial feeding, and arc fuse shaping technology.

The laser powder melting technology is a new type of additive manufacturing among them, and does not need traditional molds, tools, fixtures, and multiple processing operations. The laser powder melting technology can quickly and accurately make complex shape workpieces. Thus, freeform manufacturing can be achieved to solve difficulty in manufacturing many complex structural workpieces in the past. A number of the processing operations are significantly reduced, and a processing cycle is cut. The more complex structural products are, and the more evident the advantages are.

However, long process time is required for a process of the laser powder melting technology, a surface formed using the laser powder melting technology is relatively rough (wave shape), and the workpieces are prone to thermal deformation due to thermal stress.

As a result, it is necessary to provide an improved laser device for additive manufacturing and an operation method thereof to solve the problems existing in the conventional technologies, as described above.

SUMMARY OF INVENTION

An object of the present disclosure is to provide a laser device for additive manufacturing and an operation method thereof, which are designed with the spectroscope unit and the lens assembly unit to split the laser beam into separate beams and to focus the separate beams. Thus, the surface roughness of said process can be reduced, and the process time can be decreased.

To achieve the above object, the present disclosure provides a laser device for additive manufacturing. The laser device for additive manufacturing comprises a laser generation unit, a spectroscope unit, a control unit, and a lens assembly unit, wherein the laser generation unit is configured to emit a laser beam, and the spectroscope unit is configured to receive the laser beam and split the laser beam into separate beams, and the control unit is electrically connected to the spectroscope unit, and the lens assembly unit is configured to receive the separate beams and reflect the separate beams to a working platform.

In one embodiment of the present disclosure, the spectroscope unit comprises a spot modulation lens assembly, and the spot modulation lens assembly is disposed at a light downstream side of the laser generation unit and configured to receive the laser beam and modulate a size of a spot of the laser beam.

In one embodiment of the present disclosure, the spectroscope unit further comprises a laser spectroscope, and the laser spectroscope is disposed at a light downstream side of the spot modulation lens assembly and configured to receive the laser beam modulated by the spot modulation lens assembly and split the laser beam into the separate beams.

In one embodiment of the present disclosure, the spectroscope unit further comprises a rotary component, the laser spectroscope is disposed in the rotary component, and the rotary component is configured to move or rotate the laser spectroscope along an optical axis direction of the laser beam modulated by the spot modulation lens assembly.

In one embodiment of the present disclosure, the spectroscope unit further comprises a space adjustment lens assembly, and the space adjustment lens assembly is disposed at a light downstream side of the laser spectroscope and configured to receive the separate beams split by the laser spectroscope and adjust a degree of divergence of the separate beams.

In one embodiment of the present disclosure, the lens assembly unit comprises a scanning galvanometer, and the scanning galvanometer is disposed at a light downstream side of the space adjustment lens assembly and configured to receive the separate beams adjusted by the space adjustment lens assembly, so that the separate beams are reflected to the working platform along a direction after being reflected from the scanning galvanometer.

In one embodiment of the present disclosure, the lens assembly unit further comprises a focusing lens assembly, and the focusing lens assembly is disposed at a light output side of the scanning galvanometer and configured to focus the separate beams reflected by the scanning galvanometer on a plane.

In one embodiment of the present disclosure, the laser device is disposed in an optical system of a powder bed melt molding device.

To achieve the above object, the present disclosure provides an operation method of a laser device for additive manufacturing. The operation method comprises a preparation step of generating a laser beam using a laser generation unit; a splitting step of splitting the laser beam into separate beams using a spectroscope unit; and a reflecting step of reflecting the separate beams to a working platform using a lens assembly unit.

In one embodiment of the present disclosure, in the splitting step, a laser spectroscope of the spectroscope unit is driven to move or rotate along an optical axis direction of the laser beam.

As described above, the laser device for additive manufacturing is designed with the spectroscope unit and the lens assembly unit to split the laser beam into separate beams and to focus the separate beams on the working platform, wherein the space and the arrangement direction of the spot (focus point) of the separate beams are controlled according to the demand of the process and scanning strategy to achieve that a single galvanometer can adjust the laser process with multiple beams. It can reduce surface roughness of said process and decrease the process time. Thus, the purpose of optimizing the process speed and accuracy can be achieved.

DETAILED DESCRIPTION OF PREFERRED EMBODIMENTS

The structure and the technical means adopted by the present disclosure to achieve the above and other objects can be best understood by referring to the following detailed description of the preferred embodiments and the accompanying drawings. Furthermore, directional terms described by the present disclosure, such as upper, lower, front, back, left, right, inner, outer, side, longitudinal/vertical, transverse/horizontal, etc., are only directions by referring to the accompanying drawings, and thus the used directional terms are used to describe and understand the present disclosure, but the present disclosure is not limited thereto.

Figure 1:
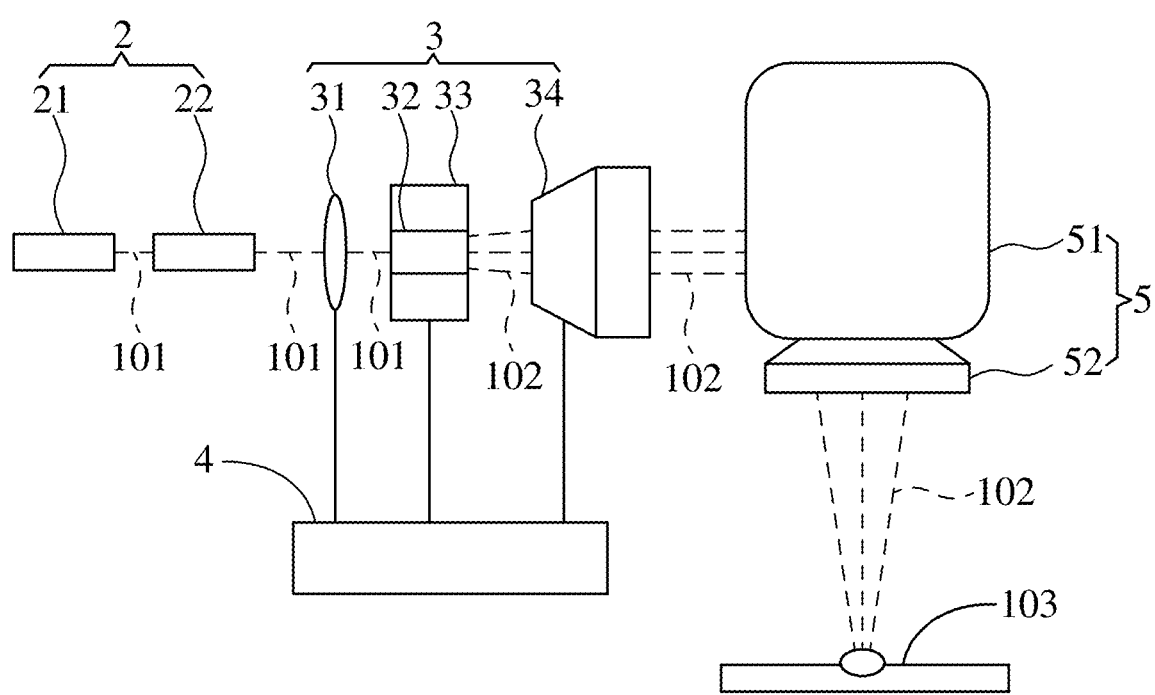
FIG. 1 is a schematic view of a laser device for additive manufacturing according to the preferred embodiment of the present disclosure.

Referring to FIG. 1, a schematic view of a laser device for additive manufacturing according to the preferred embodiment of the present disclosure is provided, wherein the laser device is disposed in a light path system of a powder bed melt molding device (not shown), and the laser device comprises a laser generation unit 2, a spectroscope unit 3, a control unit 4, and a lens assembly unit 5. The detailed structure of each component, assembly relationships, and principles of operation for the present invention will be described in detail hereinafter.

Referring to FIG. 1, the laser generation unit 2 is configured to emit a laser beam 101, wherein the laser generation unit 2 has a laser generator 21 and a collimator 22. The laser generator 21 is provided for generating the laser beam 101 emitted toward the collimator 22. The collimator 22 is configured to assist a traveling direction of the laser beam 101 in being substantially parallel to a straight light (also known as collimated light or parallel light).

Figure 2:
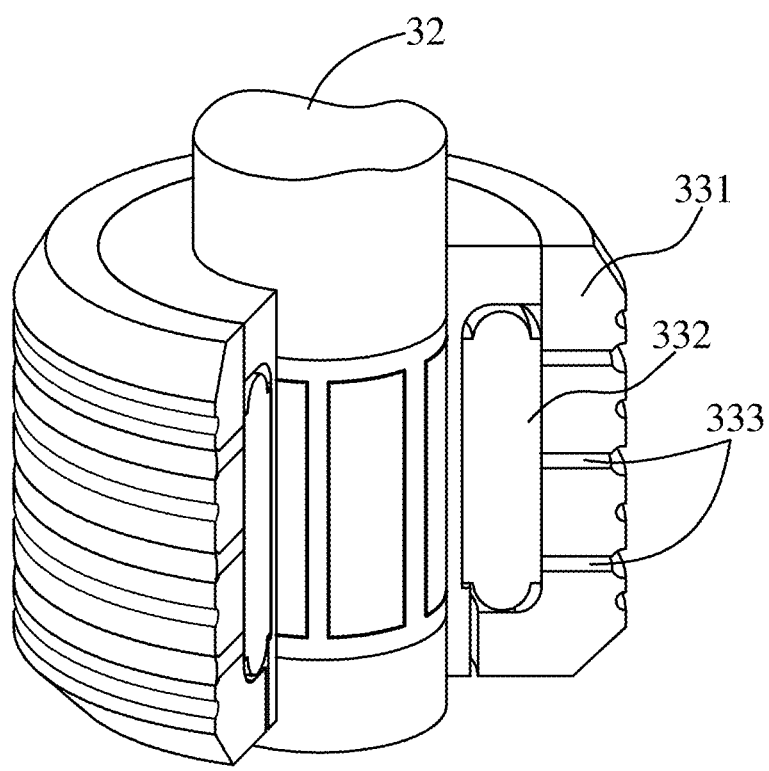
FIG. 2 is a schematic view of a rotary component of the laser device for additive manufacturing according to the preferred embodiment of the present disclosure.

Referring to FIGS. 1 and 2, the spectroscope unit 3 is configured to receive the laser beam 101 and split the laser beam 101 into separate beams 102, and the spectroscope unit 3 has a spot modulation lens assembly 31, a laser spectroscope 32, a rotary component 33, and a space adjustment lens assembly 34.

Furthermore, the spot modulation lens assembly 31 is disposed at a light downstream side of the laser generation unit 2 and configured to receive the laser beam 101 and modulate a size of a spot of the laser beam 101. The laser spectroscope 32 is disposed at a light downstream side of the spot modulation lens assembly 31 and configured to receive the laser beam 101 modulated by the spot modulation lens assembly 31 and split the laser beam 101 into the separate beams 102. In the preferred embodiment, the laser spectroscope 32 is a diffraction optical element (DOE) for forming multiple beams by splitting. The number of the separate beams 102 split from the laser beam 101 is three, and the number of the separate beams 102 can be adjusted according to demand. For example, the number of the separate beams 102 is an odd number, such as the number 3, 5, 7, or 9.

Referring to FIGS. 1 and 2, the laser spectroscope 32 is disposed in the rotary component 33, and the rotary component 33 is configured to move or rotate the laser spectroscope 32 along an optical axis direction of the laser beam 101 modulated by the spot modulation lens assembly 31. In the preferred embodiment, the rotary component 33 can be a rotary hollow motor, an air bearing, or a magnetic bearing. The rotary component 33 is an air bearing shown in FIG. 2. Specifically, the rotary component 33 has a shell 331, a stator 332, and a plurality of air inlets 333, wherein the stator 332 is disposed inside the shell 331, the air inlets 333 are formed in the shell 331, and the laser spectroscope 32 is located inside the rotary component 33 and is a rotor. The rotary component 33 drives a position control of rotary speed and linear location of the rotary component 33 by a rotary driving and linear driving motor and a controller linked to the control unit 4 (such as computer), wherein the laser spectroscope 32 (shown in FIG. 2) can be installed within the rotary component 33 to form a rotary mechanism with a rotary shaft. Thus, the laser spectroscope 32 rotates beams with respect to the rotary component 33.

Referring to FIGS. 1 and 2, the space adjustment lens assembly 34 is disposed at a light downstream side of the laser spectroscope 32 and configured to receive the separate beams 102 split by the laser spectroscope 32 and adjust a degree of divergence of the separate beams 102.

Referring to FIGS. 1 and 2, the control unit 4 is connected to the spot modulation lens assembly 31, the rotary component 33 and the space adjustment lens assembly 34 of the spectroscope unit 3, wherein the control unit 4 can control the spot modulation lens assembly 31 to modulate the size of the spot of the laser beam 101. In the preferred embodiment, the spot modulation lens assembly 31 changes a focus position of the spot according to a length of a light path and modulates the size of the spot according to the optical axis direction. In addition, the control unit 4 also controls the rotary component 33 to move along the optical axis direction of the laser beam 101 or rotate along the optical axis being a central axis. For example, the position control of rotary speed and linear location of the rotary component 33 are driven by the rotary driving and linear driving motor and the controller, or a forward rotation and a reverse rotation of the rotary component 33 are driven along the optical axis being the central axis. The control unit 4 further controls the space adjustment lens assembly 34 to adjust the degree of divergence of the separate beams 102.

Referring to FIGS. 1 and 2, the lens assembly unit 5 is configured to receive the separate beams 102 and reflect the separate beams 102 to a working platform 103, wherein the lens assembly unit 5 comprises a scanning galvanometer 51 and a focusing lens assembly 52. The scanning galvanometer 51 is disposed at a light downstream side of the space adjustment lens assembly 34 and configured to receive the separate beams 102 adjusted by the space adjustment lens assembly 34, so that the separate beams 102 are reflected to the working platform 103 along a direction after being reflected from the scanning galvanometer 51. The focusing lens assembly 52 is disposed at a light output side of the scanning galvanometer 51 and configured to focus the separate beams 102 reflected by the scanning galvanometer 51 on a plane.

Figure 3A:
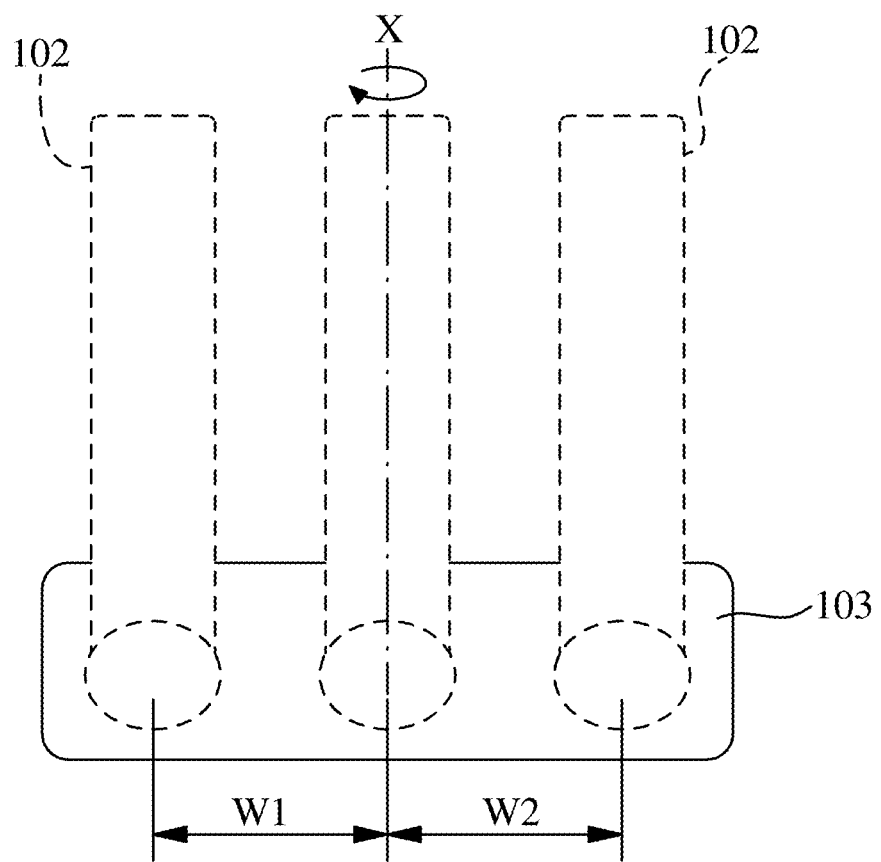
FIGS. 3a and 3b are schematic views of separate beams reflected to a working platform of the laser device for additive manufacturing according to the preferred embodiment of the present disclosure.
Figure 3B:
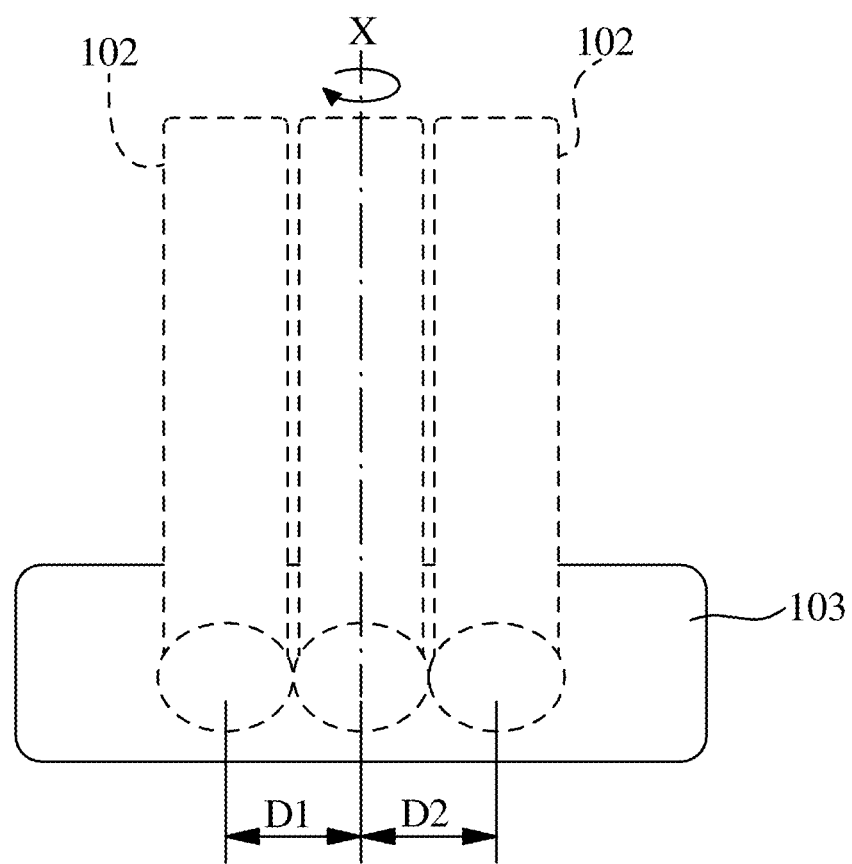
Figure 4A:
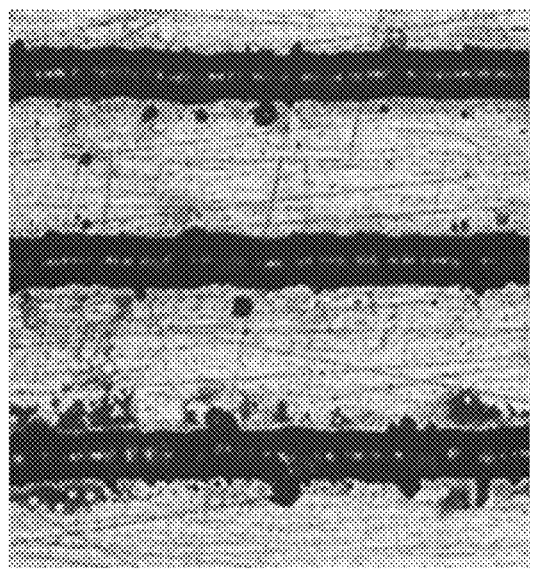
FIGS. 4a and 4b are patterns actually displayed with separate beams reflected to a working platform of the laser device for additive manufacturing according to the preferred embodiment of the present disclosure.
Figure 4B:
Figure 5:
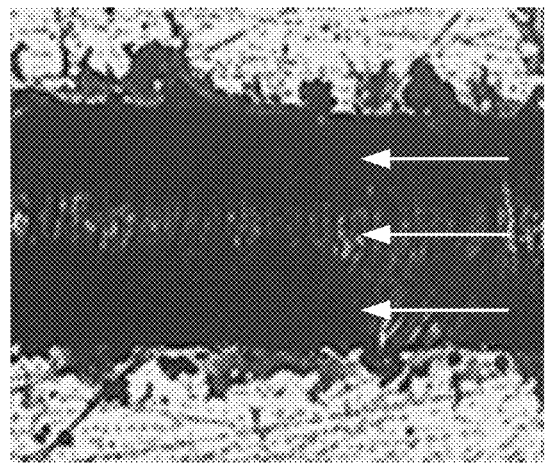
FIG. 5 is a pattern actually displayed with a single laser scanning trajectory of the laser device for additive manufacturing according to the preferred embodiment of the present disclosure.
Figure 6:
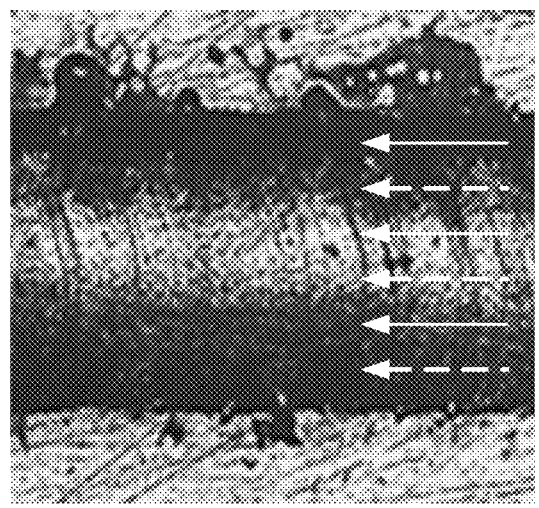
FIG. 6 is a pattern actually displayed with a two-zone laser scanning trajectory of the laser device for additive manufacturing according to the preferred embodiment of the present disclosure.

Referring to FIGS. 1, 3a and 3b, the separate beams 102 split from the laser spectroscope 32 are transmitted to the working platform 103 through the space adjustment lens assembly 34, the scanning galvanometer 51, and the focusing lens assembly 52, wherein an axis of a spot of a second beam 102 is a rotary axis X, and a spot of a first beam and a spot of a third beam can be processed for the position control of rotary speed and linear location according to the rotary axis X being a central axis by driving the rotary component 33. Thus, a space and an arrangement direction of the separate beams 102 are adjusted. For example, large spaces are shown in FIG. 3a, wherein a space W1 is formed between the first beam 102 and the second beam 102, and a space W2 is formed between the second beam 102 and the third beam 102. A pattern actually displayed with the separate beams is shown in FIG. 4a. Narrow spaces are shown in FIG. 3b, wherein a space D1 is formed between the first beam 102 and the second beam 102, and a space D2 is formed between the second beam 102 and the third beam 102. A pattern actually displayed with the separate beams is shown in FIG. 4b. In addition, FIG. 5 shows a single laser scanning trajectory (as shown by solid lines), and the single laser scanning trajectory can scan with three beams at the same time. Compared with a single beam in the prior art, the laser scanning time can be saved by 83%. FIG. 6 further shows a two-zone laser scanning trajectory (as shown by solid and dashed lines). Compared with the single beam in the prior art, the laser scanning time can be saved by 66%, and the laser scanning trajectory is flatter.

According to the described structure, the size of the spot of the laser beam 101 is adjusted by the spot modulation lens assembly 31 after the laser beam 101 is emitted from the collimator 22. Then the laser beam 101 is split into the separate beams 102 by the laser spectroscope 32, and the degree of divergence of the separate beams 102 caused by splitting are adjusted by the space adjustment lens assembly 34. After that, movement of the rotary component 33 is controlled by the control unit 4, so that the rotary component 33 are moved along the optical axis direction or rotated along the optical axis being the central axis. Thus, the space and the arrangement direction of the separate beams 102 are adjusted. Finally, the separate beams 102 are reflected to the working platform 103 by the scanning galvanometer 51, and the focusing lens assembly 52 is adopted to assist the scanning galvanometer 51 and focus the separate beams 102 on the same plane to process a laser operation.

As described above, the laser device for additive manufacturing is designed with the spectroscope unit 3 and the lens assembly unit 5 to split the laser beam 101 into the separate beams 102 and to focus the separate beams on the working platform 103, wherein the space and the arrangement direction of the spot (focus point) of the separate beams 102 are controlled according to the demand of the process and scanning strategy to achieve that a single galvanometer can adjust the laser process with multiple beams. It can reduce surface roughness of said process and decrease the process time. Thus, the purpose of optimizing the process speed and accuracy can be achieved.

Figure 7:
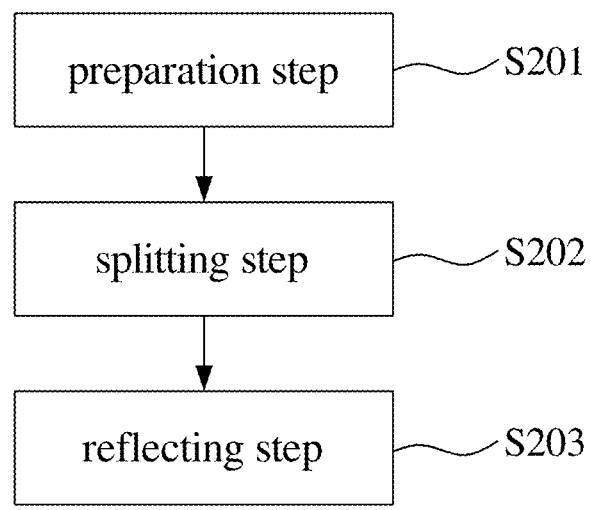
FIG. 7 is a flowchart of an operation method of the laser device for additive manufacturing according to a preferred embodiment of the present disclosure.

Referring to FIG. 7 in conjunction with FIG. 1, an operation method of a laser device for additive manufacturing is provided and operated by said laser device for additive manufacturing, wherein the operation method comprises a preparation step S201, a splitting step S202, and a reflecting step S203.

Referring to FIG. 7 in conjunction with FIG. 1, in the preparation step S201, a laser beam 101 is generated by using a laser generation unit 2. In the preferred embodiment, the laser beam 101 is generated by a laser generator 21, and emitted by the collimator 22, and a traveling direction of the laser beam 101 assisted to be substantially parallel to a straight light by the collimator 22.

Referring to FIG. 7 in conjunction with FIG. 1, in the splitting step S202, the laser beam 101 is split into separate beams 102 by a spectroscope unit 3, and a laser spectroscope 32 of the spectroscope unit 3 is driven to move along an optical axis direction of the laser beam 101 and to rotate along the optical axis being the central axis. Thus, a space and an arrangement direction of the separate beams 102 are adjusted.

Referring to FIG. 7 in conjunction with FIG. 1, in the reflecting step S203, the separate beams 102 are reflected to a working platform 103 by a lens assembly unit 5. In the preferred embodiment, the separate beams 102 are reflected to the working platform 103 by the scanning galvanometer 51, and the focusing lens assembly 52 is adopted to assist the scanning galvanometer 51 and focus the separate beams 102 on the same plane to process a laser operation.

As described above, according to the operation method of a laser device for additive manufacturing the present disclosure, the laser beam 101 is split into the separate beams 102 and the separate beams are focused on the working platform 103, wherein the space and the arrangement direction of the spot (focus point) of the separate beams 102 are controlled according to the demand of the process and scanning strategy to achieve that a single galvanometer can adjust the laser process with multiple beams. It can reduce surface roughness of said process and decrease the process time. Thus, the purpose of optimizing the process speed and accuracy can be achieved.

The present disclosure has been described with preferred embodiments thereof and it is understood that many changes and modifications to the described embodiments can be carried out without departing from the scope and the spirit of the invention that is intended to be limited only by the appended claims.

What is claimed is:

1. A laser device for additive manufacturing, comprising:
a laser generation unit configured to emit a laser beam;
a spectroscope unit configured to receive the laser beam and split the laser beam into separate beams, wherein the spectroscope unit comprises a spot modulation lens assembly, a laser spectroscope, and a rotary component, wherein the spot modulation lens assembly is disposed at a light downstream side of the laser generation unit and configured to receive the laser beam and modulate a size of a spot of the laser beam, the laser spectroscope is disposed at a light downstream side of the spot modulation lens assembly and configured to receive the laser beam modulated by the spot modulation lens assembly and split the laser beam into the separate beams, the laser spectroscope is disposed in the rotary component, and the rotary component is configured to move or rotate the laser spectroscope along an optical axis direction of the laser beam modulated by the spot modulation lens assembly;
a control unit electrically connected to the spectroscope unit; and
a lens assembly unit configured to receive the separate beams and reflect the separate beams to a working platform;

wherein the rotary component includes a shell, a stator, and a plurality of air inlets, wherein the stator is disposed inside the shell, the air inlets are formed in the shell, and the laser spectroscope is located inside the rotary component and configured to be a rotor.

2. The laser device according to claim 1, wherein the spectroscope unit further comprises a space adjustment lens assembly, and the space adjustment lens assembly is disposed at a light downstream side of the laser spectroscope and configured to receive the separate beams split by the laser spectroscope and adjust a degree of divergence of the separate beams.

3. The laser device according to claim 1, wherein the lens assembly unit comprises a scanning galvanometer, and the scanning galvanometer is disposed at a light downstream side of the space adjustment lens assembly and configured to receive the separate beams adjusted by the space adjustment lens assembly, so that the separate beams are reflected to the working platform along a direction after being reflected from the scanning galvanometer.

4. The laser device according to claim 3, wherein the lens assembly unit further comprises a focusing lens assembly, and the focusing lens assembly is disposed at a light output side of the scanning galvanometer and configured to focus the separate beams reflected by the scanning galvanometer on a plane.

5. The laser device according to claim 1, wherein the laser device is disposed in an optical system of a powder bed melt molding device.

6. An operation method of a laser device for additive manufacturing according to claim 1, comprising:
a preparation step of generating a laser beam using a laser generation unit;
a splitting step of splitting the laser beam into separate beams using a spectroscope unit; and
a reflecting step of reflecting the separate beams to a working platform using a lens assembly unit.

7. The operation method according to claim 6, wherein in the splitting step, a laser spectroscope of the spectroscope unit is driven to move or rotate along an optical axis direction of the laser beam.

* * * * *